United States Patent
Wisniewski et al.

[11] Patent Number: 6,027,155
[45] Date of Patent: Feb. 22, 2000

[54] VEHICLE STORAGE SYSTEM

[75] Inventors: Chester R. Wisniewski; Daniel J. Koester, both of Holland, Mich.

[73] Assignee: Johnson Controls Technology Company, Plymouth, Mich.

[21] Appl. No.: 09/146,445

[22] Filed: Sep. 3, 1998

[51] Int. Cl.[7] ....................................... B60N 3/12
[52] U.S. Cl. ............................................ 296/37.1
[58] Field of Search ................................. 296/37.1, 37.6; 410/115

[56] References Cited

U.S. PATENT DOCUMENTS 5,501,384  3/1996  Wisniewski .
5,535,931  7/1996  Barlow et al. .
5,669,537  9/1997  Saleem et al. .
5,687,895  11/1997  Allison et al. .

*Primary Examiner*—Gary Hoge
*Attorney, Agent, or Firm*—Harness, Dickey & Pierce, P.L.C.

[57] ABSTRACT

A storage system for a vehicle cargo compartment which includes a cover attached to the floor of the cargo compartment at a location spaced from an upright wall of the cargo compartment. The cover extends from the floor to the upright wall at a location above the floor thereby enclosing a storage space defined by the floor, upright wall and the cover. The cover is attached to the floor by a pivot mechanism enabling the cover to rotate between open and closed positions. The cover can be removably attached to the floor so that it can be removed from the floor to merge the storage space with the remaining space of the cargo compartment, if necessary. The cover is preferably made of a translucent or transparent material whereby items placed within the storage space can be seen.

21 Claims, 4 Drawing Sheets

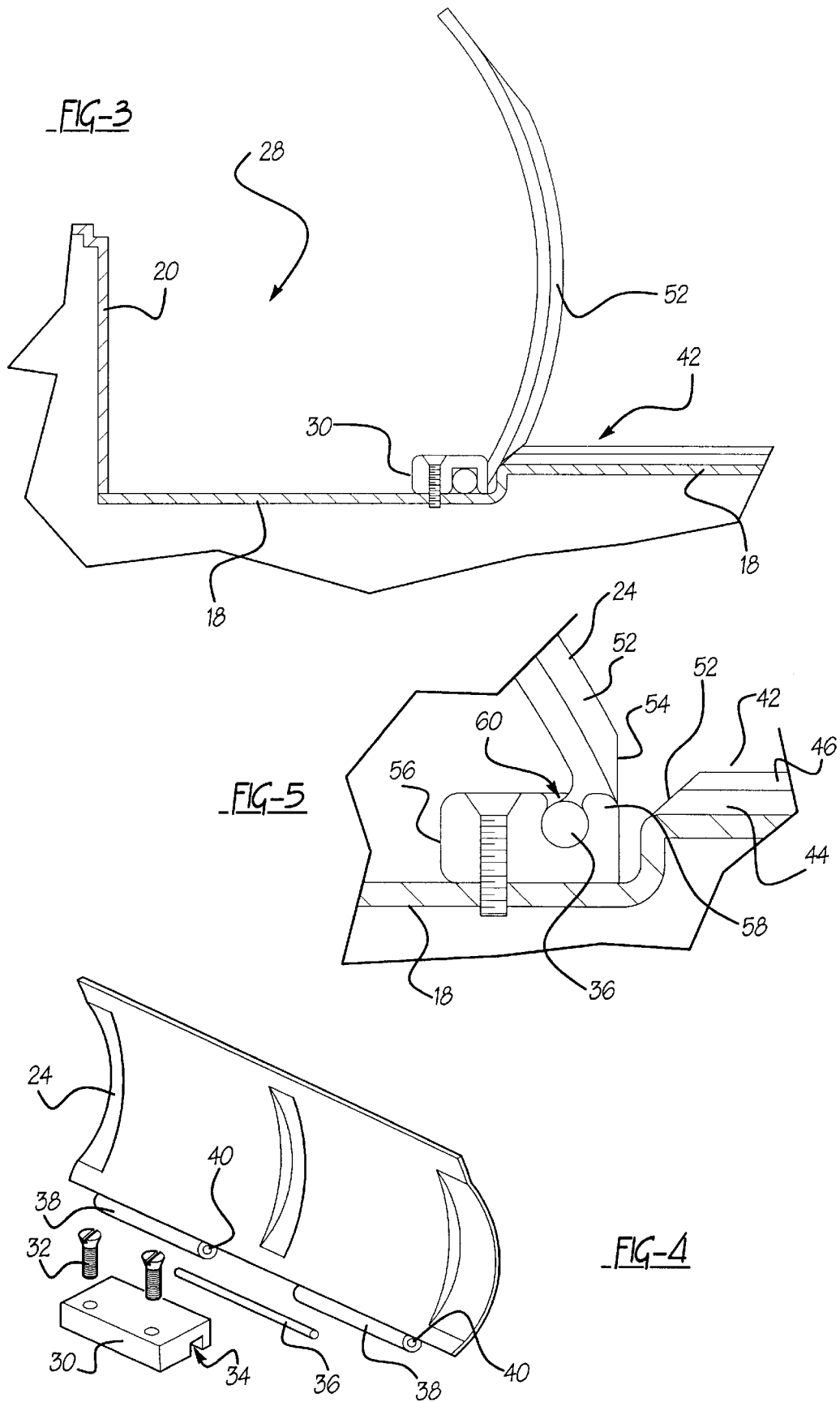

VEHICLE STORAGE SYSTEM

BACKGROUND OF THE INVENTION

The present invention relates to a vehicle storage system and in particular to a storage system in a cargo compartment of a vehicle in which a cover is rotatably attached to the cargo compartment floor and extends from the floor to an adjacent wall to define an enclosed space together with the floor and the adjacent wall.

Automobile manufacturers are constantly striving to assess the needs of their customers and provide vehicles with features that meet those needs. One area of need is in convenient storage of cargo within a motor vehicle. Motor vehicles have long been equipped with a cargo carrying compartment, such as a trunk, to facilitate carrying of cargo within the vehicle. In the past, the trunk has been formed as a single, large enclosed space within which objects can be placed ranging from large suitcases to small items such as a can of oil, etc.

One difficulty in carrying smaller items is that they are typically free to move about the trunk during vehicle operation. One solution to the problem of loose items within the trunk has been the use of cargo netting within the trunk to hold small items within a smaller confined space within the larger trunk. Such cargo netting may extend across the trunk from one side to the other, near the end of the trunk so that items within the netting are confined between the netting and the rear wall of the trunk. While such netting performs satisfactorily, it can be difficult to place items such as grocery bags within the cargo netting. It may be necessary to use two hands to hold the netting back while placing the grocery bag within the trunk. This may necessitate first placing the bag in the trunk, often on top of the netting, and then pulling the netting from beneath the grocery bag over the top of the bag. This is often a cumbersome operation.

It is thus an object of the present invention to provide a storage system within a vehicle cargo compartment, such as the trunk, which can be simply operated with one hand to open and close the system to place items in the cargo compartment.

SUMMARY OF THE INVENTION

The storage system of the present invention provides a cover that extends from the floor of the vehicle cargo compartment, at a location spaced from an upright wall, to the upright wall at a location above the floor. The floor, the upright wall and the cover together define and enclose a space within the cargo compartment. A pivot mechanism, such as a hinge, attaches the cover to the floor for rotation of the cover between a closed position in which the cover is adjacent to the upright wall and encloses the storage space and an open position in which the cover is spaced from the wall to open the storage space to place items therein. Small items can be placed within the storage space and enclosed therein by moving the cover back to the closed position. Alternatively, larger objects, such as grocery bags, can be placed in the storage space between the open cover and the upright wall and held in place within the trunk by the open cover. The cover may be removable so that when larger items are needed to be carried within the trunk, the cover is removed from the trunk floor, thereby joining the storage space enclosed by the cover with the remainder of the trunk.

The cover is preferably made of a transparent or translucent material so that the items within the storage system can be seen. In addition, the removable cover is preferably shaped to fit against a side panel within the trunk and attached thereto once removed from the trunk floor. The cover is thus conveniently stored within the trunk and does not occupy an excessive amount of trunk space. The storage system may have one or more separately movable covers.

Further objects, features and advantages of the invention will become apparent from a consideration of the following description and the appended claims when taken in connection with the accompanying drawings.

BRIEF DESCRIPTION OF THE DRAWINGS

FIG. 3 is side view like FIG. 2 with the cover in a closed position;

FIG. 4 is an exploded perspective view of the hinge for attaching the cover to the cargo compartment floor;

FIG. 5 is a side view of an alternative embodiment of the hinge;

DETAILED DESCRIPTION OF THE PREFERRED EMBODIMENT

Figure 1:
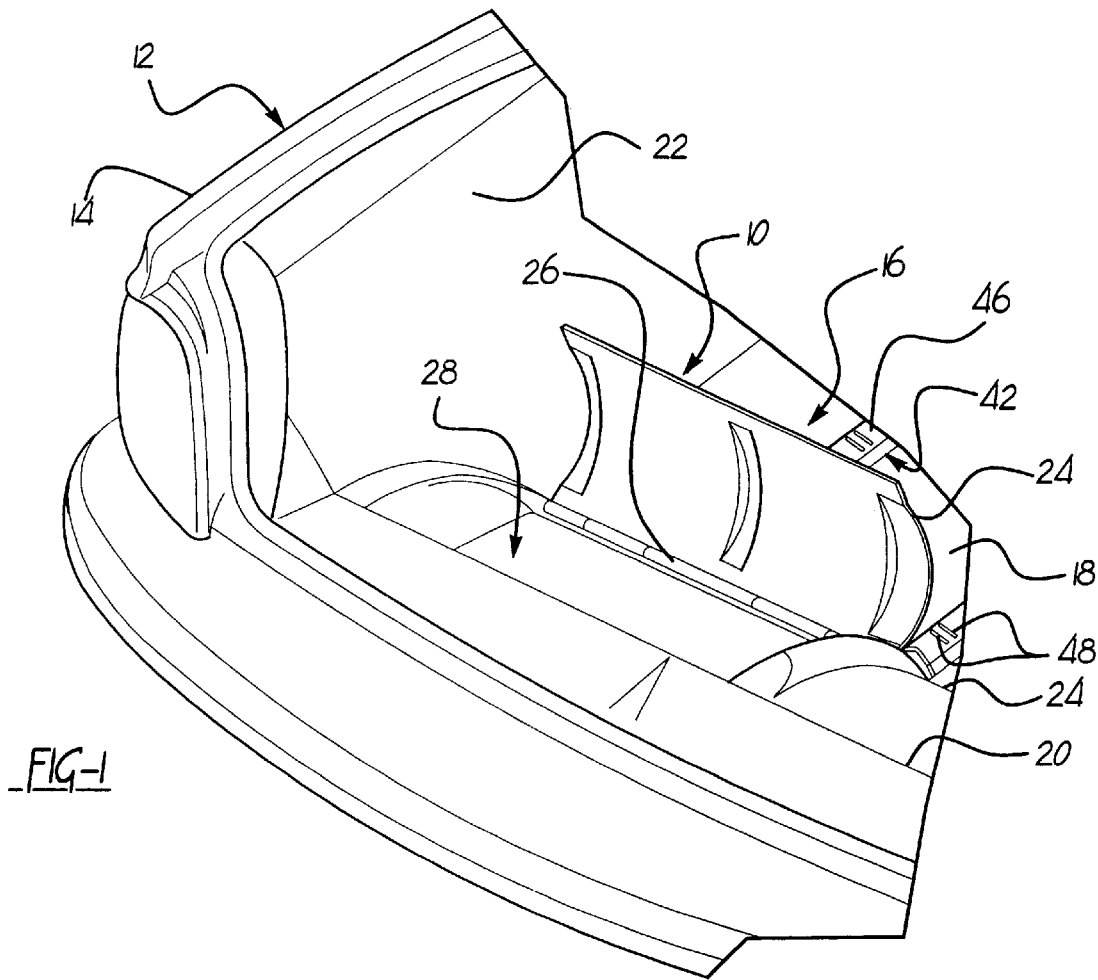
FIG. 1 is a perspective view of the storage system within the trunk with one cover open and the second cover closed.

The storage system of the present invention is shown in FIG. 1 and designated generally at 10. The storage system 10 is contained within a vehicle 12 which includes a body 14. The body 14 forms a cargo compartment 16. Within the cargo compartment there is a generally horizontal floor 18, a rear upright wall 20 and spaced left and right side walls 22, of which only the left upright side wall is shown.

The floor and the upright wall 20 are preferably both part of the structure of the body 14 of the vehicle 12. That is, the floor 18 and upright wall 20 would be preferably present in the vehicle 12 even if the vehicle 12 did not have the storage system 10. By forming the storage system 10 using the structure of the body 14 of the vehicle 12, the cost of fabricating the storage system 10 is reduced. In addition, the design and fabrication of the storage system 10 is less complex.

The storage system 10 is formed by one or more covers 24 which are attached to the floor 18 by a pivot mechanism, such as a hinge 26, described in greater detail below. Two covers 24 are shown. The hinge 26 is spaced from the upright wall 20. The covers 24 extend from the hinge 26 upward and toward the wall 20 and rest upon the wall 20 when the covers 24 are in the closed positions as shown in FIG. 3. The covers 24 rest upon the wall 20 at a location spaced above the floor 18. Thus, when the covers are in closed positions, the covers 24, floor 18 and upright wall 20, together define an enclosed storage space 28.

The storage system 10 is shown extending laterally across the trunk along the rear wall 20. The storage system 10 extends from the left side wall 20 to the right side wall 22. The side walls 20, 22 thus form lateral ends to the storage space 28. The invention is not limited to use along a rear upright wall 20 of the trunk but could be used along the side walls 22 or a front wall of the trunk if desired. With the cover 24 closed, items can be contained within the storage space 28 and be completely enclosed therein.

Figure 2:
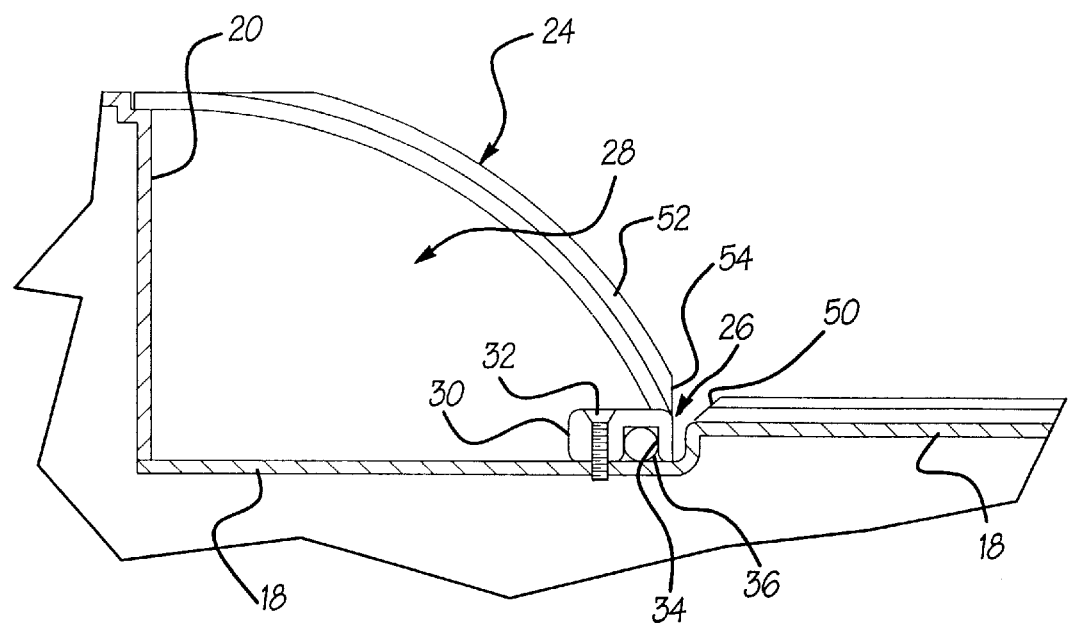
FIG. 2 is a side view of the storage system of the present invention with the cover in an open position.

With reference to FIG. 4, the hinge 26 is shown in greater detail. The hinge 26 includes a pivot block 30 which is attached to the vehicle floor screws 32. The pivot block 30 has a channel 34 in the lower surface of the pivot block 30 which extends along the length of the pivot block. A pivot rod 36 is captured within the channel 34. The pivot rod 36 extends beyond the length of the pivot block 30 and is seated into a hinge portion 38 at the lower end of the cover 24. The pivot rod 36 can be insert molded into the cover 24 or can be subsequently installed within a bore 40 within the cover hinge portion 38. The hinge mechanism 26 allows the cover 24 to rotate about the longitudinal axis of the pivot rod 36 between the open and closed positions shown in FIGS. 2 and 3. At least one pivot block will be used for each cover 24. Other hinge or pivot mechanisms can be used, such as a conventional hinge with a pair of leaves rotatably coupled to a pin. The covers can each be molded with aligned pivot pins fixed to brackets mounted to the floor 18 for rotation about the pivot pin axis.

The floor 18 of the vehicle cargo compartment is formed with raised skid rails 42 along which cargo can be slid into and out of the cargo compartment. The skid rails 42 are formed by a raised portion 44 in the floor 18 with an aluminum or other metal plate 46 attached thereto. The raised portion 44 forms a cavity beneath the metal plate 46. The plate 46 has a plurality of spaced slots 48 for receiving the end of a tie down member, such as a bungee cord, to secure cargo to the floor 18.

The rear end of each skid rail 42 is formed with an inclined surface 50. The covers 24 are formed with raised ribs 52 which are aligned with the skid rails 42 on the floor 18. At the upper and lower ends of the raised ribs 52, the ribs have tapered surfaces 54. The tapered surfaces 54 at the lower hinge end of the cover 24, engage the inclined surfaces 50 at the end of the skid rails 42 when the cover 24 is rotated to its open position. The engagement of the cover 24 with the skid rail 42 forms a rotation stop for the cover 24 in the open position. As shown, this open position is a substantially upright position whereby the cover 24 forms an upright wall intermediate the trunk front end and the rear wall 20. Cargo items, such as a grocery bag, which do not fit within the storage space 28 with the cover 24 closed, can be placed in the storage space 28 between the trunk rear wall 20 and the open cover 24. The cover 24 retains the grocery bag within the space 28 and prevents the bag from tipping forward during hard braking or otherwise shifting within the vehicle cargo compartment 16. Milk bottles, and other liquid containers, can be maintained in an upright position to avoid tipping and possible leaking within the cargo compartment. The hinge 26 can include a detent to hold it in the upright position and provide resistance to returning to the closed position. The covers 24 can be equipped with a latch to hold the covers in closed positions. The covers may also have slots in the raised ribs 52 as tie down attachments.

Figure 6:
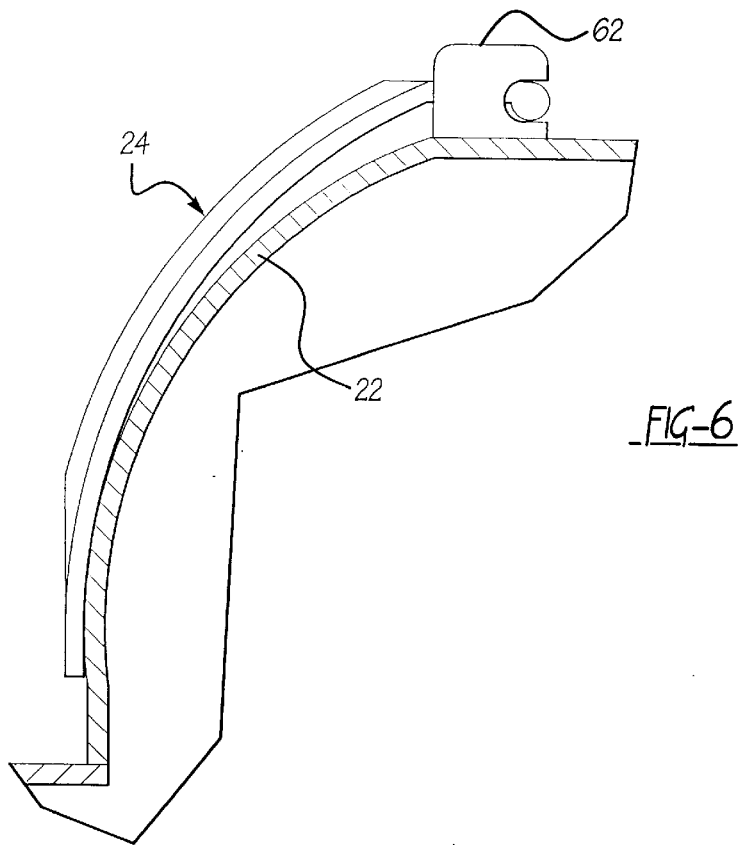
FIG. 6 is a side view showing the cover attached to a cargo compartment side wall for storage.

An alternative embodiment of the pivot block 30 is shown in FIG. 5. There, the pivot block 56 has a hook shaped snap finger 58 forming a channel 60 for the pivot rod 36. The pivot rod 36 can be removed from the channel 60. The pivot block 56 can thus be used to removably mount the cover 24 to the floor 18. Such a removable mounting of the cover 24 enables the cover to be removed from the floor 18 in the event that larger cargo needs to be placed in the cargo compartment 16 which would intrude into the storage space 28. By removing the cover 24, the storage space 28 can be joined with the remainder of the cargo compartment 16 to carry the larger items. As shown in FIG. 6, a mounting hook 62 can be provided on the side wall 22 to enable the removed cover 24 to be attached to the side wall and held in place. By shaping the cover 24 to the same shape as the side wall 22, the cover 24 can be stored along the side wall 22 in substantially surface to surface contact and not occupy an excessive amount of space within the storage cargo compartment 16.

Figure 7:
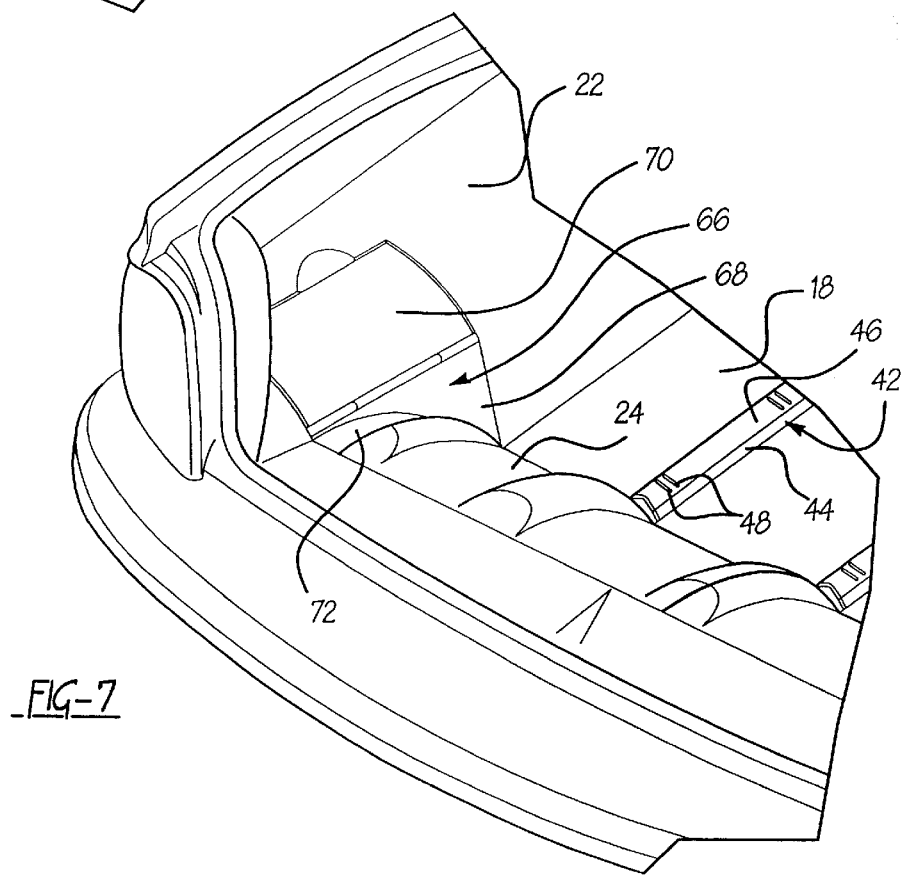
FIG. 7 is a perspective view of an alternative embodiment of the storage system with a secondary storage space.
Figure 8:
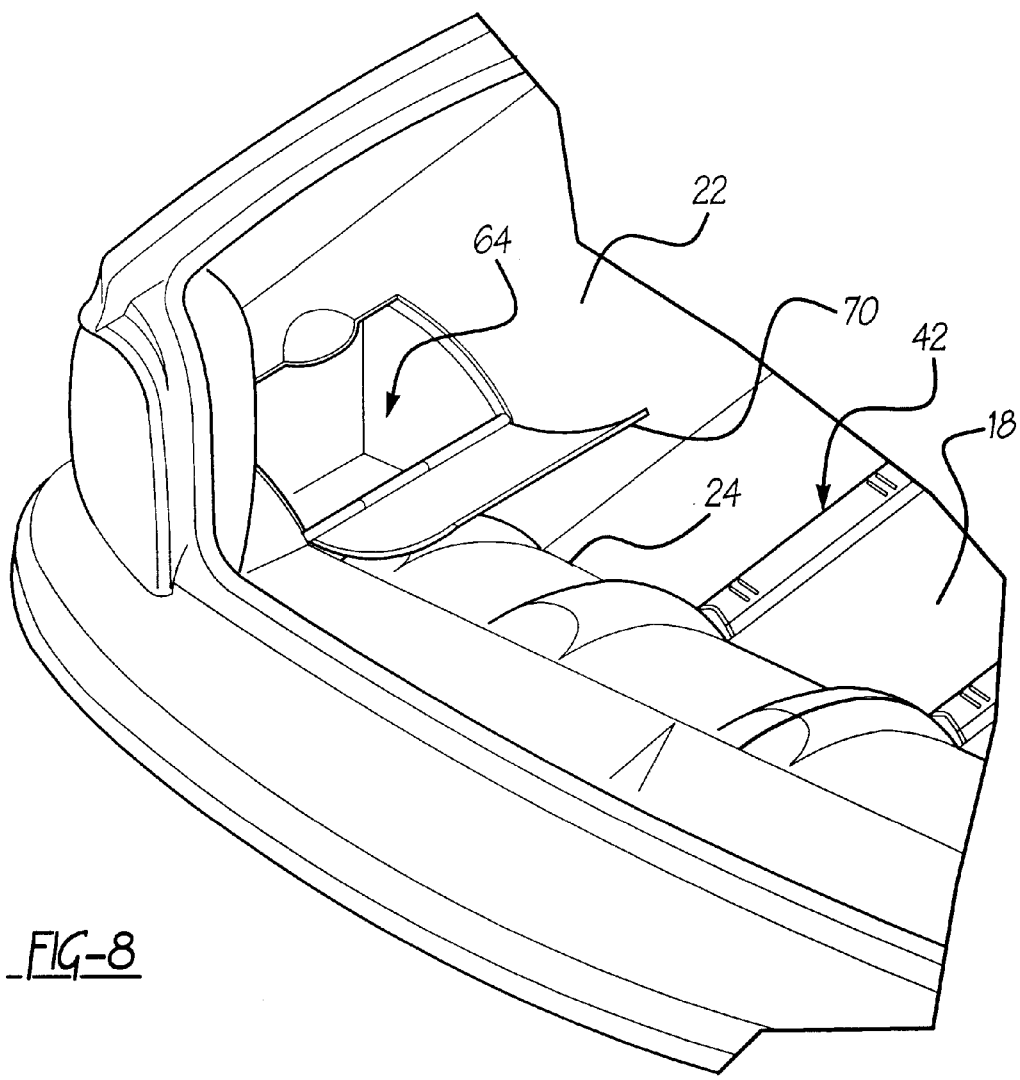
FIG. 8 is a perspective view similar to FIG. 7 with the secondary storage space open.

An alternative embodiment of the present invention is shown in FIG. 7. There, a secondary storage space 64 is formed in a recess in the side wall 22. The side wall extends into the cargo compartment 16 around the rear wheel and tire of the vehicle (not shown). Behind the rear wheel and tire a recess is formed in the side wall 22. A cover 66 can be placed over the space 64. The cover 66 has a lower wall 68 fixed to the cargo compartment side wall 22. An upper wall is 70 is hinged to the lower wall 68 and rotates between a closed position shown in FIG. 7 and an open position shown in FIG. 8. The lower wall 68, fixed to the cargo compartment side wall 22, forms the end of the storage space 28 described above. The lower wall 68 can be formed with an outwardly extending flange 72 which aligns with the cover 24 when the cover 24 is in the closed position, forming an end portion of the storage compartment 28. The secondary storage compartment 64 can be used to store small items that are typically kept within the trunk such as bungee cords for use with the skid rails 42, oil cans, jumper cables, etc. This keeps these items contained within the cargo compartment and out of the way. The primary storage space 28 can then be used to contain items that are being transported home from the store and only in the vehicle for one or two trips.

The storage space 28 can be formed with a single cover 24 or multiple covers 24 whereby only one portion of the storage space 28 is opened at a time. When multiple covers are used, they are preferably identical to one another to minimize separate part numbers and inventory. By using a rigid panel cover which can be made of stamped metal, molded plastic or formed fiber board, etc., the cover 24 maintains its shape and can be easily opened and closed with one hand while holding a grocery bag or other object in the other hand. The storage system of the present invention thus facilitates storage and transportation of cargo within a motor vehicle.

The upright wall is preferably formed by a structural component of the vehicle body. As used herein, the body structure broadly includes such items as a seat back as well as body side walls, rear body panels, front body panels, liftgates and door closures, either sliding or hinged. The upright wall 20 need not be fixed to the floor 18 but simply located adjacent to the floor and extending upwardly above the floor. The wall need not be perpendicular to the floor either. The wall 20 could be formed by a movable door closure or a seat back.

The terms "cargo compartment" and "trunk" have been used interchangeably herein. The invention is not limited to the trunk of a sedan type passenger vehicle. The invention can be used in a hatchback, van or sport utility vehicle in the cargo compartments thereof. Hence, the term "cargo compartment" is intended to have a broader meaning than the term "trunk".

It is to be understood that the invention is not limited to the exact construction illustrated and described above, but that various changes and modifications may be made without departing from the spirit and scope of the invention as defined in the following claims.

We claim:

1. A storage system for a vehicle having a cargo compartment with a floor and an upright wall, said storage system comprising:

a cover which extends from the floor at a location spaced from the upright wall to the wall at a location spaced above the floor to enclose a storage space defined by the floor, the upright wall and said cover;

a pivot mechanism attaching said cover to the floor for rotation of the cover between a closed position in which said cover is adjacent the upright wall and encloses said storage space and an open position in which said cover is substantially upright and spaced from the upright wall to open said storage space; and, a stop to limit continued rotation of said cover beyond said open position whereby cargo can be contained between said cover in said upright open position and the upright wall and retained in place by said cover.

2. The storage system as defined in claim 1 wherein said cover is comprised of multiple panels separately movable between said open and closed positions, each said panel enclosing a portion of said storage space when in said closed positions.

3. The storage system as defined in claim 1 wherein the upright wall is a rear wall of the vehicle cargo compartment and said cover rotates forward from the rear wall to said open position.

4. The storage system as defined in claim 3 further comprising a forward rotation stop for said cover to hold said cover in a generally upright orientation when said cover is in said open position.

5. The storage system as defined in claim 4 wherein the floor of the vehicle cargo compartment is formed with raised skid rails extending forward from said cover and said cover engages a rear end of the skid rails to stop forward rotation of said cover.

6. The storage system as defined in claim 1 wherein said pivot mechanism removably attaches said cover to the cargo compartment floor.

7. The storage system as defined in claim 6 wherein the vehicle cargo compartment includes a second upright wall and said storage system further comprises a fastener to releasably mount said cover to the second upright wall for storage of said cover when said cover has been removed from the cargo compartment floor.

8. The storage system as defined by claim 7 wherein said cover has substantially the same shape as the second upright wall of the cargo compartment whereby said cover fits substantially flush upon the second upright wall.

9. The storage system as defined in claim 1 wherein said cover is translucent or transparent whereby cargo within the storage space is visible.

10. The storage system as defined in claim 1 wherein said cover is a curved panel.

11. The storage system as defined in claim 1 further comprising skid rails extending forward along the cargo compartment floor and projecting upward above the floor.

12. The storage system as defined in claim 11 further comprising spaced tie-down slots in said skid rails.

13. A storage system for a vehicle having a body which forms a cargo compartment with a floor and an upright wall extending upwardly from the floor, said storage system comprising:

a cover which extends from the floor at a location spaced from the upright wall to the upright wall at a location spaced above the floor to enclose a primary storage space defined by said cover and the floor and the upright wall of the body whereby the need for trim components to form said primary storage space is reduced;

a pivot mechanism attaching said cover to the floor for rotation of the cover between a closed a position in which said cover is adjacent the upright wall and encloses said primary storage space and an open position in which said cover is spaced from said upright wall to open said primary storage space; and, a forward rotation stop for said cover to hold said cover in a 2generally upright orientation when said cover is in said open position.

14. The storage system as defined in claim 13 wherein said cover includes multiple panels separately movable between said closed and open positions.

15. The storage system as defined in claim 14 wherein each of said multiple panels are identical to one another.

16. The storage system as defined in claim 13 wherein the upright wall is a rear wall and said cover extends rearward for said pivot mechanism and upward to the upright rear wall.

17. The storage system as defined in claim 16 wherein the vehicle body includes spaced upright side walls at opposite sides of the cargo compartment and one of the side walls forms a recess adjacent said primary storage space and said storage system further comprising a side cover attached to the side wall to enclose the recess and form a secondary storage space with said side cover forming an end of said primary storage space.

18. The storage system as defined in claim 17 wherein said side cover includes a lower wall fixed to the side wall of the vehicle cargo compartment and an upper wall rotatably attached to the lower wall for rotation between a closed position enclosing said secondary storage space and an open position in which said secondary storage space is open.

19. The storage system as defined in claim 13 wherein said forward rotation stop is formed by raised skid rails on the floor extending forward from said cover and said cover engages a rear end of the skid rails to stop forward rotation of said cover.

20. A storage system for a vehicle having a cargo compartment with a floor and an upright wall, said storage system comprising:

a cover which extends from the floor at a location spaced from the upright wall to the wall at a location spaced above the floor to enclose a storage space defined by the floor, the upright wall and said cover;

and a pivot mechanism attaching said cover to the floor for rotation of the cover between a closed position in which said cover is adjacent the upright wall and encloses said storage space and an open position in which said cover is spaced from the upright wall to open said storage space, wherein said cover is comprised of multiple panels separately movable between said open and closed positions, each said panel enclosing a portion of said storage space when in said closed positions.

21. A storage system for a vehicle having a cargo compartment with a floor and an upright wall, said storage system comprising:

a cover which extends from the floor at a location spaced from the upright wall to the wall at a location spaced above the floor to enclose a storage space defined by the floor, the upright wall and said cover;

and a pivot mechanism attaching said cover to the floor for rotation of the cover between a closed position in which said cover is adjacent the upright wall and encloses said storage space and an open position in which said cover is spaced from the upright wall to open said storage space, wherein said cover is translucent or transparent whereby cargo within the storage space is visible.

\* \* \* \* \*

UNITED STATES PATENT AND TRADEMARK OFFICE
CERTIFICATE OF CORRECTION

PATENT NO. : 6,027,155
DATED : February 22, 2000
INVENTOR(S) : Chester R. Wisniewski and Daniel J. Koester It is certified that error appears in the above-identified patent and that said Letters Patent is hereby corrected as shown below:

Column 6, Line 5, Claim 13, "2generally" should read as --generally--.

Signed and Sealed this

Thirteenth Day of February, 2001

Attest:

NICHOLAS P. GODICI

Attesting Officer     Acting Director of the United States Patent and Trademark Office